United States Patent
Liu et al.

(10) Patent No.: US 10,461,994 B2
(45) Date of Patent: Oct. 29, 2019

(54) METHOD FOR RESPONSE TO BEAM FAILURE RECOVERY REQUEST

(71) Applicant: Futurewei Technologies, Inc., Plano, TX (US)

(72) Inventors: Bin Liu, San Diego, CA (US); Pengfei Xia, San Diego, CA (US); Richard Stirling-Gallacher, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/815,658

(22) Filed: Nov. 16, 2017

(65) Prior Publication Data
US 2018/0367374 A1 Dec. 20, 2018

Related U.S. Application Data

(60) Provisional application No. 62/521,170, filed on Jun. 16, 2017.

(51) Int. Cl.
| | |
|---|---|
| *H04W 16/28* | (2009.01) |
| *H04L 12/24* | (2006.01) |
| *H04L 12/26* | (2006.01) |
| *H04W 76/18* | (2018.01) |
| *H04L 5/14* | (2006.01) |
| *H04W 56/00* | (2009.01) |
| *H04W 74/08* | (2009.01) |
| *H04W 88/02* | (2009.01) |
| *H04W 88/08* | (2009.01) |

(52) U.S. Cl.
CPC .......... *H04L 41/0677* (2013.01); *H04L 43/08* (2013.01); *H04W 16/28* (2013.01); *H04W 76/18* (2018.02); *H04L 5/14* (2013.01); *H04W 56/001* (2013.01); *H04W 74/0833* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2007/0123263 A1 | 5/2007 | Smith et al. | |
| 2013/0010723 A1* | 1/2013 | Ouchi | H04L 5/0048 370/329 |

(Continued)

FOREIGN PATENT DOCUMENTS

CN 101765116 A 6/2010

OTHER PUBLICATIONS

Guo, Li, "Method and apparatus for beam recovery in next generation wireless systems", U.S. Appl. No. 62/513,083, filed May 31, 2017 (Year: 2017).*

(Continued)

*Primary Examiner* — Christopher M Crutchfield
*Assistant Examiner* — Thinh D Tran
(74) *Attorney, Agent, or Firm* — Vierra Magen Marcus LLP (57) ABSTRACT

The disclosure relates to technology for beam failure recovery in user equipment. The user equipment sends a beam failure recovery request to the base station upon detection of a beam failure between the base station and the user equipment, and monitors one or more candidate beams in which to receive the beam failure recovery request response from the base station, based on an association between a beam failure recovery request response and a beam failure recovery request.

27 Claims, 8 Drawing Sheets

(56) References Cited

U.S. PATENT DOCUMENTS

| | | |
|---|---|---|
| 2016/0150591 A1 | 5/2016 | Tarighat Mehrabani et al. |
| 2016/0183233 A1 | 6/2016 | Park et al. |
| 2018/0110066 A1 | 4/2018 | Luo et al. |
| 2018/0288756 A1 | 10/2018 | Xia et al. |
| 2018/0302889 A1* | 10/2018 | Guo ............... H04W 72/046 |
| 2018/0368142 A1* | 12/2018 | Liou ............. H04W 72/0446 |

OTHER PUBLICATIONS

R1-1717813 CATT, "Consideration on beam failure recovery", 3GPP TSG RAN WG1 Meeting 90bis, Oct. 9-13, 2017 (Year: 2017).*

R1-1717606 Samsung, "Beam failure recovery", 3GPP TSG RAN WG1 Meeting 90bis, Oct. 9-13, 2017 (Year: 2017).*

R1-1717473 VIVO, "Discussion on beam failure recovery", 3GPP TSG RAN WG1 Meeting 90bis, Oct. 9-13, 2017 (Year: 2017).*

R1-1717302 Huawei, "Beam failure recovery design details", 3GPP TSG RAN WG1 Meeting 90bis, Oct. 9-13, 2017 (Year: 2017).*

RP-180475 Qualcomm Incorporated,"Identified inconsistencies between RAN1 and RAN2 decisions on beam management",3GPP RAN #79,Chennai, India,Mar. 19-22, 2018,total 3 pages.

PCT/CN2018/088962, ISR, dated Jun. 27, 2018.

Office Action dated Jan. 2, 2019 in U.S. Appl. No. 15/814,372, 13 pages.

Office Action dated Dec. 21, 2018 in U.S. Appl. No. 15/796,449, 16 pages.

* cited by examiner

METHOD FOR RESPONSE TO BEAM FAILURE RECOVERY REQUEST

CLAIM FOR PRIORITY

This application claims the benefit of priority to U.S. Provisional Application No. 62/521,170, filed Jun. 16, 2017, the entire contents of which are hereby incorporated by reference.

FIELD

The disclosure generally relates to wireless communication networks, and in particular, to recovering from a beam failure between user equipment and a base station.

BACKGROUND

As the demand for capacity in mobile broadband communications increases drastically every year, wireless communication systems are increasing their capability of handling mobile traffic. In next generation systems, such as fifth generation (5G) technologies, advanced communications, such as millimeter-wave (mm-wave) communications, with potential multigigabit-per-second data rates are candidate technologies to increase overall capacity and transmission speeds. Highly directional beamforming antennas are necessary at both the base station (BS) and mobile station (MS) to compensate for the high attenuation in the mm-wave frequency band and to extend its transmission range.

A misalignment between transmitting (Tx) and receiving (Rx) beams may cause a significant loss in the received power, especially for systems with narrow beams, and result in beam failure. To avoid such beam failure, beam alignment in mm-wave communication systems is necessary to find the best beam pair from all possible beam pairs for maximum beamforming efficiency. However, when a beam failure occurs, a reporting and recovery mechanism is employed to report and recover from the failure. During the 3GPP TSG RAN WG1 #89, it was agreed upon to support a non-contention based PRACH-like channel based on the Physical Random Access Channel (PRACH) and the Physical Uplink Control Channel (PUCCH) for beam failure recovery request transmission. PRACH denotes uplink channel transmitted by a terminal so as to establish initial synchronization, whereas PUCCH denotes an uplink control channel.

BRIEF SUMMARY

According to one aspect of the present disclosure, there is provided a method for beam failure recovery in user equipment, including sending a beam failure recovery request (BFRR) to the base station upon detection of a beam failure between the base station and the user equipment; and monitoring one or more candidate beams in which to receive a BFRR response from the base station, based on an association between a beam failure recovery request (BFRR) response and the BFRR.

Optionally, in any of the preceding aspects, the monitoring further monitors one or multiple physical downlink control channels (PDCCH) such that a demodulation reference signal of each PDCCH is spatially quasi co-located with a reference signal of one of the one or more available candidate beams.

Optionally, in any of the preceding aspects, the candidate beams are identified by the user equipment for data transmission.

Optionally, in any of the preceding aspects, when the BFRR response is not received within a predetermined time period, the user equipment restarts the beam failure recovery.

Optionally, in any of the preceding aspects, upon detection of the beam failure, the BFRR is sent using a physical uplink control channel (PUCCH) in the uplink beam pair.

Optionally, in any of the preceding aspects, when the BFRR is sent using the PUCCH, the user equipment identifies a downlink beam pair for the base station to send the BFRR response in the uplink beam pair.

Optionally, in any of the preceding aspects, upon detection of the beam failure, the BFRR is sent using a physical random access channel (PRACH) or a PRACH-like channel in the uplink beam pair.

Optionally, in any of the preceding aspects, the method further including selecting the one or more candidate beams based on radio link quality.

Optionally, in any of the preceding aspects, the association between the BFRR response and the BFRR is a time offset.

Optionally, in any of the preceding aspects, the time offset is conveyed during beam configuration signaling or pre-configured with system information over a physical broadcast channel or specified in a technical standard.

Optionally, in any of the preceding aspects, the association is represented by a time offset from the BFRR to the starting position of the BFRR response monitoring window.

Optionally, in any of the preceding aspects, the time offset is a fixed.

Optionally, in any of the preceding aspects, the time offset is signaled by one or more of a radio resource configuration message, a medium access control element message, or a downlink control indicator message.

Optionally, in any of the preceding aspects, the association is represented by a time offset from the BFRR to the ending position of the BFRR response monitoring window.

Optionally, in any of the preceding aspects, the monitoring the one or more candidate beams further includes monitoring for the BFRR response in the downlink beam pairs spatially quasi co-located with the BFRR in a time slot with a time offset to the BFRR.

Optionally, in any of the preceding aspects, when two or more uplink beam pairs exist, each having a spatial quasi co-located downlink beam pair, further comprising transmitting multiple BFRRs in two or more uplink beam pairs simultaneously.

Optionally, in any of the preceding aspects, when two or more uplink beam pairs exist, each having a spatial quasi co-located downlink beam pair, further comprising transmitting multiple BFRRs in the uplink beam pairs in time division duplex (TDD).

Optionally, in any of the preceding aspects, the method further including selecting the one or more candidate beams based on radio link quality.

Optionally, in any of the preceding aspects, wherein the association between the BFRR response and the BFRR is a time offset.

Optionally, in any of the preceding aspects, the time offset is conveyed during beam configuration signaling or pre-configured with system information over a physical broadcast channel or specified in a technical standard.

Optionally, in any of the preceding aspects, the association is represented by a time offset from the BFRR to the starting position of the BFRR response monitoring window.

Optionally, in any of the preceding aspects, the time offset is a fixed value.

Optionally, in any of the preceding aspects, the time offset is signaled by one or more of a radio resource configuration message, a medium access control element message, or a downlink control indicator message.

Optionally, in any of the preceding aspects, the association is represented by a time offset from the BFRR to the ending position of the BFRR response monitoring window.

Optionally, in any of the preceding aspects, the monitoring the one or more candidate beams further includes monitoring for the BFRR response in the downlink beam pairs spatially quasi co-located with the BFRR in a time slot with a time offset to the BFRR.

Optionally, in any of the preceding aspects, when two or more uplink beam pairs exist, each having a spatial quasi co-located downlink beam pair, further comprising transmitting multiple BFRRs in two or more uplink beam pairs simultaneously.

Optionally, in any of the preceding aspects, when two or more uplink beam pairs exist, each having a spatial quasi co-located downlink beam pair, further comprising transmitting multiple BFRRs in the uplink beam pairs in time division duplex (TDD).

According to one other aspect of the present disclosure, there is provided a device, including a non-transitory memory storage comprising instructions; and one or more processors in communication with the memory, wherein the one or more processors execute the instructions to send a beam failure recovery request (BFRR) to the base station upon detection of a beam failure between the base station and the device; and monitor one or more candidate beams in which to receive a BFRR response from the base station, based on an association between a beam failure recovery request (BFRR) response and the BFRR.

According to one aspect of the present disclosure, there is provided a non-transitory computer-readable medium storing computer instructions for beam failure recovery in user equipment, that when executed by one or more processors, cause the one or more processors to perform the steps of sending the BFRR to the base station upon detection of a beam failure between the base station and the user equipment; and monitoring one or more candidate beams in which to receive a BFRR response from the base station, based on an association between a beam failure recovery request (BFRR) response and the BFRR.

According to still another aspect of the present disclosure, there is provided a method for handling beam failure recovery in a base station, including receiving a BFRR from a user equipment identifying a new candidate beam; and transmitting a BFRR response associated with the received BFRR.

Optionally, in any of the preceding aspects, the association between the BFRR response and received BFRR is represented by a time offset from the BFRR reception to the starting position of a time window within which to transmit the BFRR response.

Optionally, in any of the preceding aspects, the time offset is a fixed value.

Optionally, in any of the preceding aspects, the time offset is signaled by one or more of a radio resource configuration message, a medium access control element message, or a downlink control indicator message.

Optionally, in any of the preceding aspects, the association is represented by a time offset from the BFRR reception to the ending position of a time window within which to transmit the BFRR response.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The disclosure relates to technology for recovering from a beam failure between user equipment and a base station.

User equipment and base stations establish a connections using downlink and uplink beam pairs. Often times, for example as a result of blockage or user equipment rotation or displacement, the connection between the user equipment and the base station is disrupted, resulting in a beam failure. To overcome such failure, a beam failure recovery mechanism may help to improve high frequency link performance.

In one embodiment, in order to recover the connection, a beam failure recovery request (BFRR) is sent by the user equipment in an attempt to reestablish the connection with the base station when a beam failure occurs. Using spatially quasi co-located information between a downlink beam pair and an uplink beam pair provided by the base station, the user equipment may monitor candidate beams in which to receive a BFRR response from the base station, where the BFRR response is associated with the BFRR and the downlink beam(s) is in a time slot with a time offset to the BFRR.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
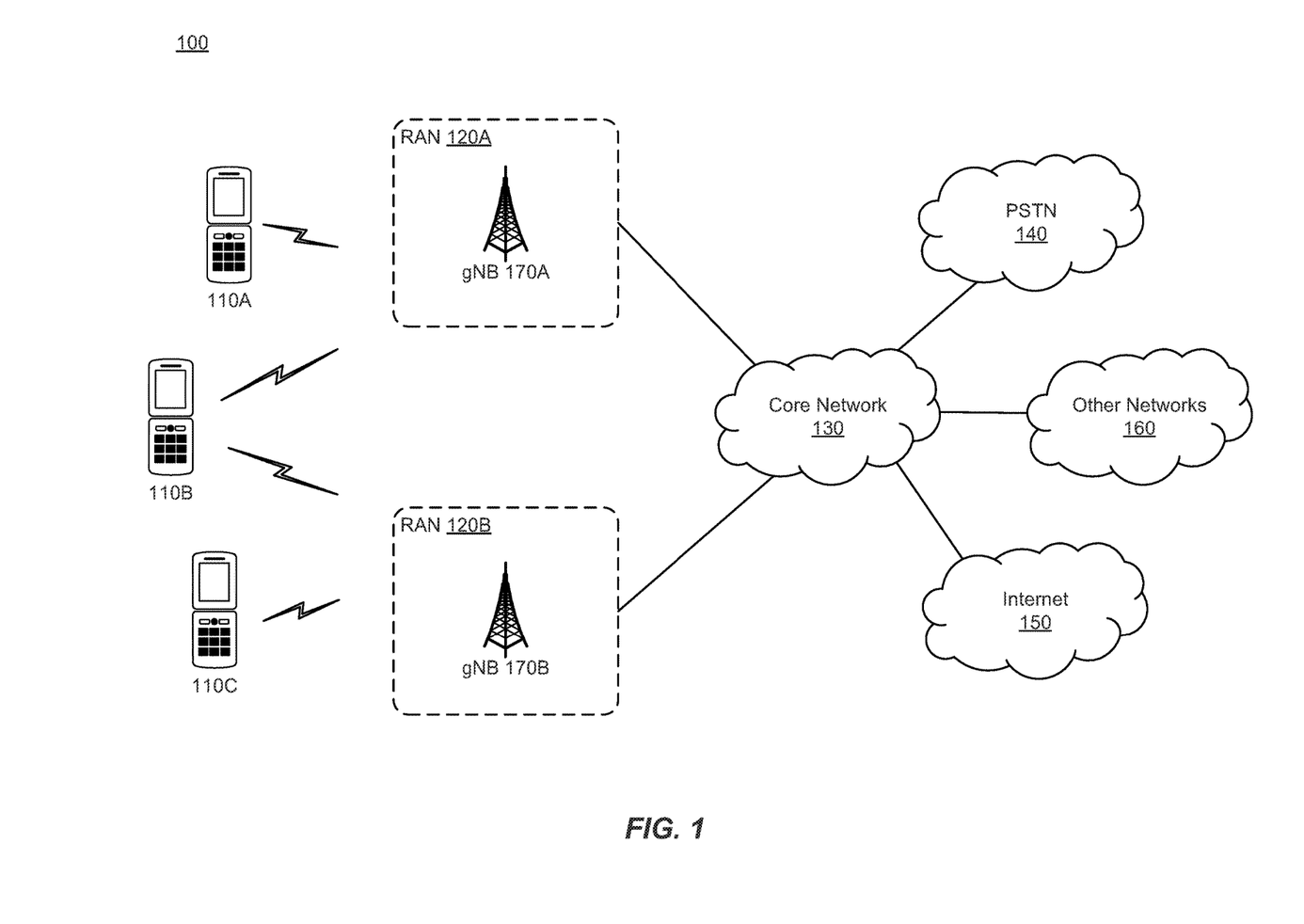
FIG. 1 illustrates a wireless network for communicating data.

FIG. 1 illustrates a wireless network for communicating data. The communication system 100 includes, for example, user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system 100. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

In the depicted embodiment, the RANs 120A-120B include one or more base stations 170A, 170B (collectively, base stations 170), respectively. Each of the base stations 170 is configured to wirelessly interface with one or more of the UEs 110A, 110B, 110C to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the user equipment 110A-110C over one or more air interfaces (not shown) using wireless communication links. The air interfaces may utilize any suitable radio access technology.

It is contemplated that the system 100 may use multiple channel access functionality, including for example schemes in which the base stations 170 and user equipment 110A-110C are configured to implement the Long Term Evolution wireless communication standard (LTE), LTE Advanced (LTE-A), and/or LTE Broadcast (LTE-B). In other embodiments, the base stations 170 and user equipment 110A-110C are configured to implement UMTS, HSPA, or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (a mmW CP) or a base station 170 capable of mmW communication (e.g., a mmW base station). The mmW APs may transmit and receive signals in a frequency range, for example, from 6 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

Figure 2:
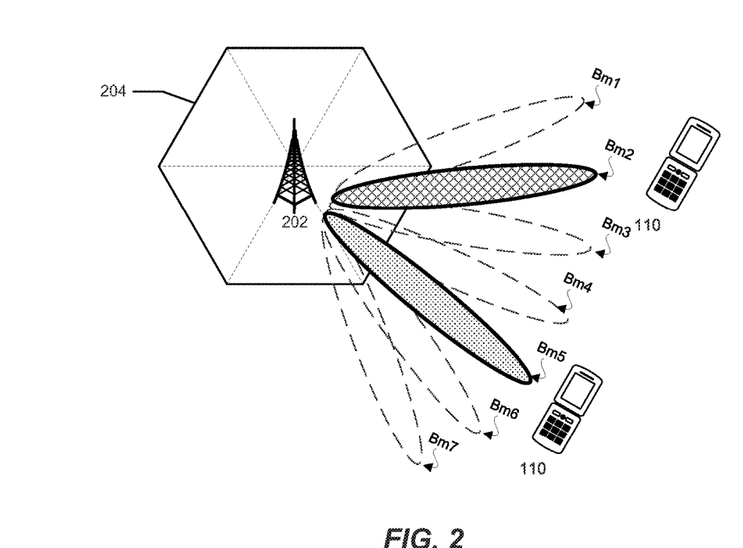
FIG. 2 illustrates a base station with transmitting and receiving beams according to an example embodiment

FIG. 2 illustrates a base station with transmitting and receiving beams according to an example embodiment. The base station 202 manages a cell 204 divided into one or more sectors as its service coverage area and forms multiple transmit/receive (Tx/Rx) beams BM1-BM7 using beamforming schemes. Beamforming generally refers to use of multiple antennas to control the direction of a wavefront by appropriately weighting the magnitude and phase of individual antenna signals. Beamforming schemes includes, but are not limited to, digital beamforming (e.g., Transmit (Tx) pre-Inverse Fast Fourier Transform (pre-IFFT) beamforming/Receive (Rx) post-Fast Fourier Transform (post-FFT)

beamforming), analog beamforming (e.g., Tx post-IFFT beamforming/Rx pre-FFT beamforming), or a combination thereof. The base station 202 transmits the beamformed signals by sweeping them simultaneously or successively, for example, beginning with beam BM1 and ending with BM7.

User equipment (UE), such as user equipment 110A-110C (FIG. 1), located within the cell of the base station 202 may be configured to receive signals omni-directionally without supporting Rx beamforming, receive signals while supporting Rx beamforming by using one beamforming pattern each time, or receive signals while supporting Rx beamforming by simultaneously using a plurality of beamforming patterns in different directions.

If the user equipment 110A-110C does not support Rx beamforming, the user equipment 110A-110C measures the channel quality of a reference signal (RS) in each transmission beam and reports the measurements to the base station 202. The station 202 selects the best beam for the user equipment 110A-110C from among a plurality of Tx beams. If the user equipment 110A-110C is configured to support Rx beamforming, the user equipment 110A-110C measures the channel qualities of multiple Tx beams received from the base station 202 for each reception beam pattern and reports a total or some high-ranked measurements of all Tx-Rx beam pairs to the base station 202. The base station 202 may allocate an appropriate Tx beam to the user equipment 110A-110C. If the user equipment 110A-110C is capable of receiving a plurality of Tx beams from the base station 202 or supporting a plurality of base station Tx-user equipment Rx beam pairs, the base station 202 may select a beam, taking into account diversity transmission through repeated transmission or simultaneous transmission.

Figure 3:
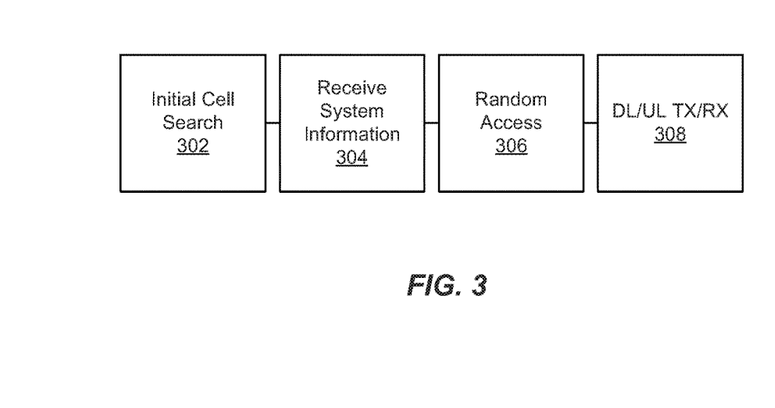
FIG. 3 illustrates physical channels and transmitting signals on the physical channels in accordance with FIG. 2.

FIG. 3 illustrates physical channels and transmitting signals on the physical channels in accordance with FIG. 2. When user equipment 110A-110C (FIG. 1) is powered on or enters a new cell, such as cell 204 (FIG. 2), the user equipment performs an initial cell search 302. The initial cell search 302 involves acquisition of synchronization to a base station, such as gNB 202. Specifically, the user equipment synchronizes its timing to the gNB and acquires a cell Identifier (ID) and other information by receiving a Primary Synchronization Channel (P-SCH) and a Secondary Synchronization Channel (S-SCH) from the gNB 202. Subsequently, the user equipment may acquire information broadcast in the cell by receiving a Physical Broadcast Channel (PBCH) from the gNB 202. During the initial cell search, the user equipment may monitor a downlink (DL) channel state by receiving a downlink reference Signal (DL RS).

After the initial cell search, the user equipment 110A-110C may acquire detailed system information at 304 by receiving a Physical Downlink Control Channel (PDCCH) and receiving a Physical Downlink Shared Channel (PDSCH) based on information included in the PDCCH.

If the user equipment 110A-110C initially accesses the gNB 202 or has no radio resources for signal transmission to the gNB 202, the user equipment 110A-110C may perform a random access procedure at 306 with the gNB 202.

Upon completion of the above process, the user equipment 110A-110C may receive a PDCCH and/or a PDSCH from the gNB 202 and transmit a Physical Uplink Shared Channel (PUSCH) and/or a PUCCH to the gNB 202, which is a general DL and UL signal transmission procedure at 308. Specifically, the user equipment 110A-110C receives Downlink Control Information (DCI) on a PDCCH. The DC includes, for example, control information such as resource allocation information for the user equipment 110A-110C.

Control information that the user equipment 110-110C transmits to the gNB 202 on the uplink (UL) channel or receives from the qNB 202 on the DL channel includes a DL/UL ACKnowledgment/Negative ACKnowledgment (ACK/NACK) signal, a Channel Quality Indicator (CQI), a Precoding Matrix Index (PMI), a Rank Indicator (RI), etc. The control information, such as a CQI, a PMI, an RI, etc., may be transmitted on a PUSCH and/or a PUCCH.

Figure 4A:
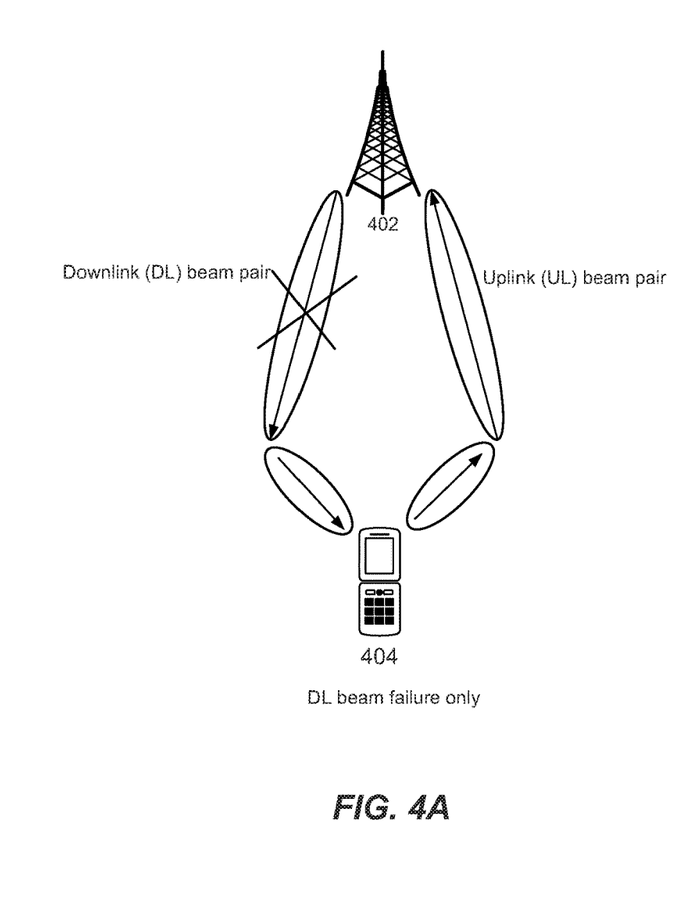
FIGS. 4A and 4B illustrate examples of beam failure between a base station and user equipment.
Figure 4B:
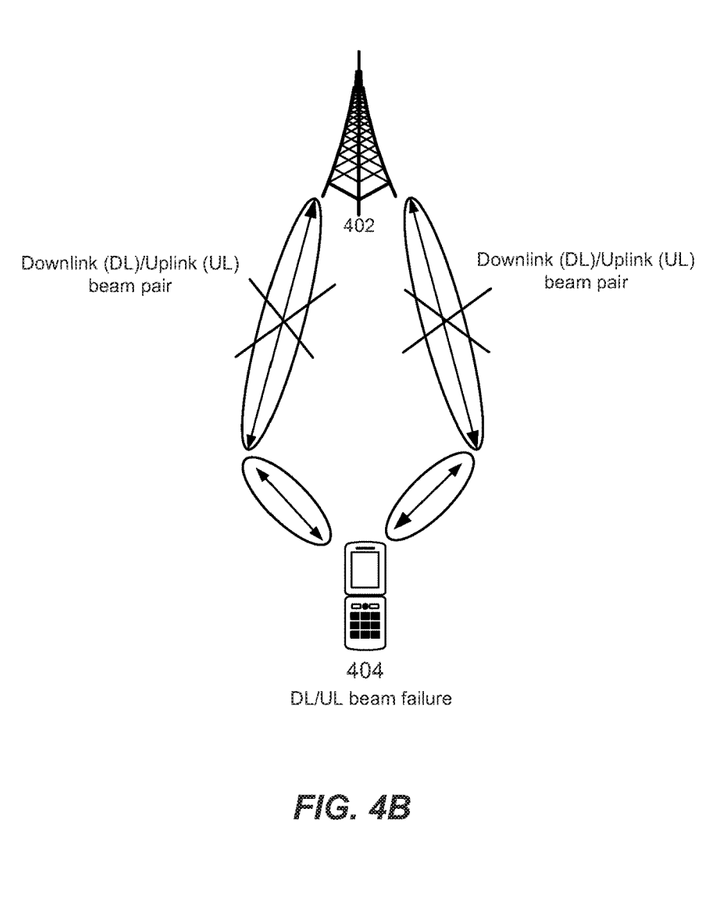

FIGS. 4A and 4B illustrate examples of beam failure between a base station and user equipment. As illustrated, base station 402 is in communication with user equipment 404, in which the base station 402 and user equipment 404 communicate via DL beam pairs and UL beam pairs. In one embodiment, the DL beam pair fails (FIG. 4A). In another embodiment, the DL/UL beam pair fails (FIG. 4B).

Before establishing a communication or beam pair link with a base station 402, user equipment 404 generally performs cell acquisition and synchronization. The cell acquisition step typically involves receiving a synchronization signal from base station 402. In a high frequency wave band, beamforming may be applied to synchronization signals (otherwise, the distance at which the synchronization signal can be received is much smaller than the distance at which the beamformed data channels can be received). If the synchronization signals are beamformed, only user equipment 404 within the narrow angle covered by the beam are able to receive the synchronization signal. To ensure that user equipment 404 receives the synchronization signal, the base station 402 may "beam-sweep" the synchronization signal having the narrow angle covered by the beam. Beam sweeping refers to rotating the direction of the beam to cover all directions such that it may be detected in areas of the beam sweep by the user equipment 404. To receive the synchronization signal, the user equipment 404 may also need to rotate the direction in which it searches for the synchronization signal. Rotation allows the beams of the base station 402 and user equipment 404 to be mutually aligned.

The cell acquisition and synchronization becomes even more complicated if the user equipment 404 is moving, as the direction of arrival of the synchronization signal beam continually changes. Under these circumstances, the user equipment 404 may try to locate multiple base stations 402 to identify multiple cells suitable for service. However, sweeping procedures to identify a group of base stations can mean a substantial increase in the cell acquisition duration.

At higher frequencies (e.g., microwave and millimeter-wave spectrum), beamformed transmissions are an important feature to overcome higher path losses. Beamforming may be applied to user equipment specific DL and UL data transmissions, and also to common channels such as synchronization and control channels on the DL and random access channels on the UL.

Since the antenna arrangements (FIG. 4C) at the base station 402 and at the user equipment 404 allow beamforming, there may be multiple beams in multiple directions for transmission and reception at each of the base stations 402 and the user equipment 404. For example, there may be any number of beam directions for reception at the user equipment 404 and any number of directions for beam transmission at the base station 402.

In the embodiment of FIG. 4A, a single or unidirectional transmission and reception beam pair are illustrated, whereas in FIG. 4B, multiple directions or omnidirectional transmission and reception beam pairs are illustrated. In either case, the system may determine the "best" beam pair(s) (e.g., the beam with the strongest signal, fastest DL/UL speed, etc.) for transmission and reception among the various reception and transmission directions. In this regard, a signal received from the base station 402 from a particular receive direction can be identified as having a corresponding transmit direction to transmit to the base station 402.

Beam pair transmission and reception (in the DL and UL beams) use multiple access technologies—orthogonal frequency division multiple access (CP-OFDMA) for the DL, and single-carrier frequency division multiple access (SC-FDMA) or CP-OFDM for the UL. Dedicated data channels are not used in next generation systems, such as LTE and 5G. Instead shared transport channel resources are used in both the DL and the UL communications between the base station 402 and the user equipment 404. These shared transport channels DL-SCH and UL-SCH are respectively mapped to the physical downlink shared channel (PDSCH) on the DL CP-OFDM subframe and physical uplink shared channel (PUSCH) on the UL SC-FDMA/CP-OFDM subframe.

The OFDM and the SC-FDMA subframes respectively include the physical downlink control channel (PDCCH) and physical uplink control channel (PUCCH). The PDCCH is used to convey user equipment-specific DL control information (DCI) from the base station 402 to the user equipment 404. Similarly, the PUCCH is used to carry UL control information (UCI) from the user equipment 404 to the base station 402, such as channel quality indication (CQI) reports, ACK/NACK responses and scheduling requests (SR).

At some point after establishing a communication or beam pair link (BPL), one of the beam pairs may fail (beam failure is represented in the diagrams by the "X" across a respective beam). Beam failure, as explained herein, may be the result of many factors, such as antenna misalignment, signal strength, etc. As illustrated in the embodiment of FIG. 4A, the DL beam has failed and the UL beam remains active. In the embodiment of FIG. 4B, both the DL and UL beams fail.

In order for the system to recover from such a beam failure, the user equipment 404 sends a beam failure recovery request (BFRR) to the base station 402. In one embodiment, when only the DL beam has failed (FIG. 4A), the user equipment 404 may use the active PUCCH (originally allocated for UCI) to report the beam failure and request recovery from the base station 402, as agreed upon during the 3GPP TSG RAN WG1 #89 meeting. In another embodiment, when the DL and UL beams have failed, the user equipment 404 may also attempt to use the PUCCH for BFRR, since user equipment has no knowledge of the status of the UL beam pair. However, beam failure recovery in this instance is less likely to be successful since both the UL and DL beams have failed. In still another embodiment, when the DL and UL beams have failed, the user equipment 404 may also attempt to use the PRACH or PRACH-like channel for BFRR. The PRACH or PRACH-like resource is directly associated with candidate beams identified by the UE. This association is indicated by NW through RRC, MAC-CE or DCI. In either case, the BFRR sent by the user equipment 404 requires a response message (BFRR response) from the base station 402 if beam failure is to be recovered. However, the user equipment 404 does not know which DL beam will be used by the base station 402 to transmit a BFRR response.

In one embodiment, when PRACH is used, the BFRR is a preamble sequence. In another embodiment, when PUCCH or PUCCH-like channel is used, the response may include a new beam index/quality and/or failed beam index.

In order for the base station 402 to send a BFRR response, the user equipment 404 first determines which candidate beam(s) may be used by the base station 402 to send a response. A candidate beam is understood to be any beam being transmitted/received by the user equipment 404 and base station 402, except for the failing beam (the beam that was detected as failing). In one embodiment, the candidate beam is determined based on the received signal strength or power.

In one embodiment, the BFRR response may include a PDCCH and PDSCH, where the content includes confirmation of the new beam index, uplink transmission grant, channel state information—reference signal (CSI-RS) configuration for beam management/refinement, etc.

To determine the candidate beam, the user equipment 402 uses the spatial quasi co-located (SQCL'ed) information between the base station 402 transmission (DL) and receive (UL) beams. Two antenna ports may be said to be SQCL'ed if large-scale properties of a radio channel over which a symbol on one antenna port is conveyed can be inferred from a radio channel over which a symbol on the other antenna port is conveyed. The large-scale properties may include, for example, delay spread, Doppler spread, Doppler shift, spatial direction, average gain, and average delay, etc.

In one embodiment, the UE 110 will monitor the base station 402 DL beam(s) SQCL'ed with the base station 402 UL receive beam for BFRR reception. Specifically, the user equipment 404 monitors the PDCCH region of a DL beam with the assumption that the corresponding PDCCH demodulation reference signal (DMRS) is SQCL'ed with the RS of the identified candidate beam(s) by the user equipment 404. To make this determination, the user equipment 404 may (1) be provided with the SQCL'ed information between the active DL/UL beam pairs directly from the base station 402, or (2) utilize beam correspondence information between the DL and UL beam pairs. Beam correspondence refers to the reciprocity between UL and DL beams. For example, if a base station 402 or user equipment 404 is able to determine the Tx beam to use based on the Rx beam, then it may be said to have beam correspondence.

In the case where the beam correspondence information is not readily available (e.g., in a multi-beam architecture for millimeter or microwave operation), the SQCL'ed information may be conveyed directly from the base station 402 in beam configuration signaling, such as Radio Resource Control (RRC). Medium Access Control (MAC)-Control Element (CE) or DL control information (DCI).

In the case where the beam correspondence is available, the user equipment 404 may determine the SQCL'ed status for the active beam pairs. For example, when beam correspondence information is available in the base station 402, the user equipment Tx beam is indicated by the base station 402 CSI-RS resource indicator, thereby enabling the user equipment to determine the SQCL'ed DL beam pair and UL beam pair.

Although not the subject of this disclosure, in one embodiment, if no SQCL'ed DL beam pair is available for the UL beam pair that was in use prior to beam failure, the user equipment 404 may employ a PRACH-like (e.g., different parameters for preamble sequences from PRACH) BFRR scheme or multiple PUCCH-based BFRRs to sweep multiple beam directions.

Figure 4C:
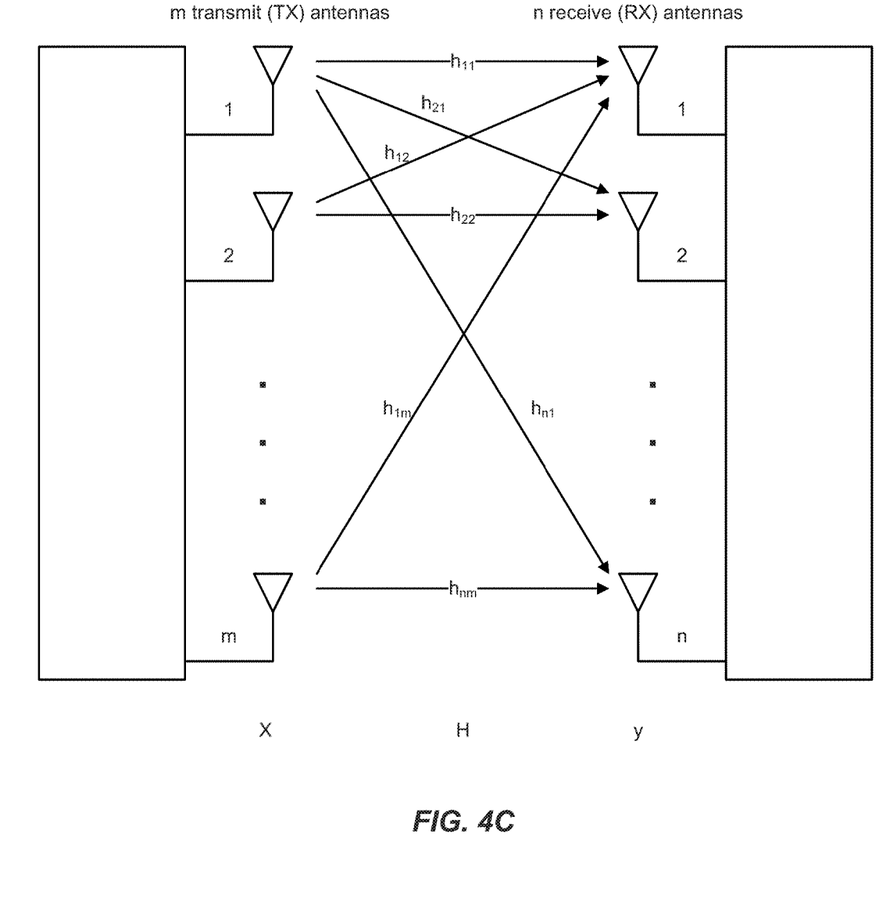
FIG. 4C illustrates a multiple input multiple output (MIMO) system with m transmit and n receive antennas.

FIG. 4C illustrates a multiple input multiple output (MIMO) system with m transmit and n receive antennas. The MIMO system depicted in the figure represents one non-limiting embodiment of transmission (TX) and reception (RX) antennas that may be used in the systems depicted in FIGS. 4A and 4B. As illustrated, the MIMO system includes m TX antennas and n RX antennas. Accordingly, the receiver receives a signal y that results when the input signal vector x is multiplied by the transmission matrix H represented by the equation y=H*x, where $$H = \begin{bmatrix} h11 & \cdots & h1m \\ \vdots & \ddots & \vdots \\ hn1 & \cdots & hnm \end{bmatrix}$$

The transmission matrix H contains the channel impulse responses $h_{nm}$, which reference the channel between the TX antenna m and the RX antenna n. The rank of the channel matrix defines the number of linearly independent rows or columns in H, and indicates how many independent data streams (layers) can be transmitted simultaneously. To increase the data rate, spatial multiplexing may be employed. Using this technique, the data is divided into separate streams which are then transmitted simultaneously over the same resources. The transmission includes reference signals that are also known to the received, such that the receiver may perform a channel estimation for each transmit antenna's signal. The receiver may then report the channel status to the transmitter via a feedback channel to enable changes to be made as channel conditions change.

Figure 5A:
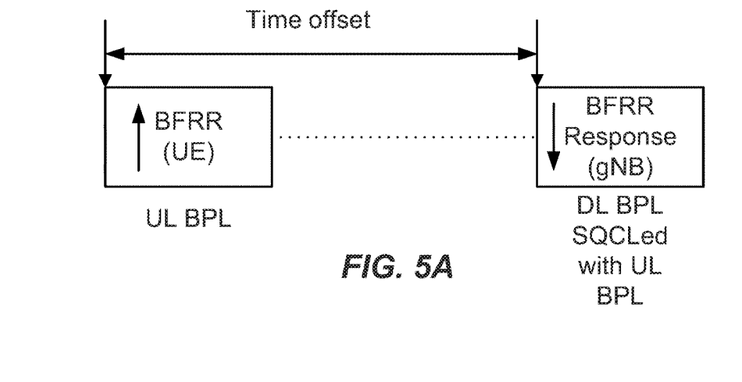
FIG. 5A illustrates an offset between a downlink beam pair and an uplink beam pair.

FIG. 5A illustrates an offset between a downlink beam pair and an uplink beam pair. In particular, FIG. 5A illustrates an association indication between the downlink beam pair for a BFRR response by the base station and the uplink beam pair for the BFRR from the user equipment for a single transmission.

As explained in the example of FIGS. 4A and 4B, in the event of a beam failure, the user equipment 404 sends a BFRR in the UL beam pair (UL BPL) to the base station 402. In return, the base station 402 responds with a BFRR response in the DL beam pair (DL BPL) that is SQCL'ed with the UL beam pair used for BFRR transmission by the user equipment 404. In order to implement the BFRR and BFRR response procedure, a transmission occasion association between the BFRR (sent by the user equipment 404) and the BFRR response (sent by the base station 2402) is used to monitor the DL beams. In one embodiment, the transmission occasion association is indicated by a time offset such that UE should monitor the DL beams for the BFRR response from the base station 402, which is SQCL'ed with the BFRR from the user equipment 404, in a time slot with a time offset relative to the BFRR, as illustrated. Here the time slot is a time window for UE monitoring BFRR response and the time offset indicates the starting position of the response monitoring window relative to the BFRR.

In one embodiment, the time offset is pre-configured with system information, such as a physical broadcast channel (PBCH), for beam failure recovery. In another embodiment, the time offset is indicated to the user equipment 404 in the beam configuration signaling, such as the RRC, MAC-CE or DCI. In yet another embodiment, the time offset is a fixed value specified by a technical standard.

Figure 5B:
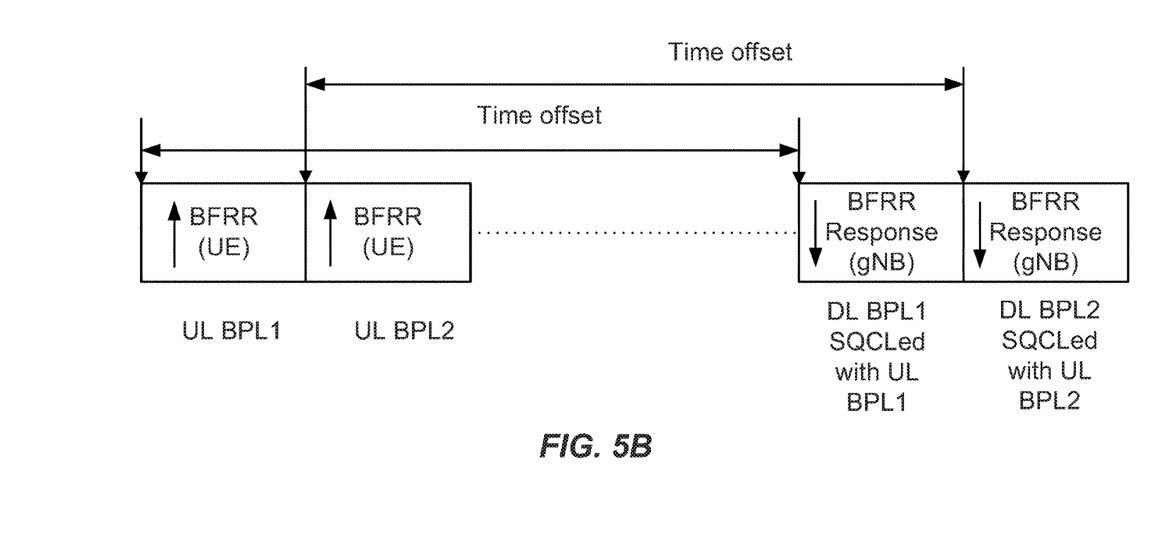
FIG. 5B illustrates an offset between a downlink beam pair and an uplink beam pair.

FIG. 5B illustrates an offset between a downlink beam pair and an uplink beam pair. In particular, FIG. 5B illustrates an offset between the DL beam pair for a BFRR response by the base station 402 and the UL beam pair for the BFRR from the user equipment 404 for multiple transmissions.

In one embodiment, when multiple UL beam pairs are available, and each beam pair has a corresponding SQCL'ed DL beam pair, the user equipment 404 may transmit multiple BFRRs in UL beam pairs (e.g., [UL BPL1, UL BPL2]) simultaneously. Simultaneous transmission may occur by the user equipment 404 (1) monitoring the SQCL'ed DL beam pairs for the BFRR response simultaneously (if the user equipment 404 Rx capability permits), (2) monitoring the "best" SQCL'ed DL beam pair (e.g., the candidate beam having the best channel quality) for the BFRR response, (3) indicating a preferred DL beam pair in the BFRR to the base station 402, in which the user equipment 404 monitors the indicated DL beam pair according to the time offset (in this case, the user equipment 404 may only monitor one DL beam, so a recommendation is made as to the best performing beam), or (4) monitoring the DL beam pair which is a wide beam and SQCLed to all configured downlink beam pairs. Although only two simultaneous transmissions are illustrated in FIG. 5B, it is appreciated that any number of simultaneous transmissions may occur.

In another embodiment, the user equipment 404 may transmit the BFRR in multiple UL beam pairs in time division duplex (TDD). Similar to the example above, the user equipment 404 may monitor the SQCL'ed DL beam pair for each UL beam pair according to pre-configured system information or a time offset provided to the user equipment 404, or the user equipment 404 may identify a preferred DL beam pair in the BFRR in which the user equipment 404 monitors the DL beam pair according to the time offset.

In still another embodiment, the user equipment 404 may identify candidate beams from multiple transmitting/receiving points (TRPs). The user equipment 404 may transmit the BFRR in multiple UL beam pairs in time division duplex (TDD) in the candidate beams. Similar to the example above, the user equipment 404 may monitor the SQCL'ed DL beam pair for each UL beam pair according to pre-configured system information or a time offset provided to the user equipment 404. The user equipment may (1) monitor the SQCL'ed DL beam pairs for the BFRR response simultaneously (if the user equipment 404 Rx capability permits) within each base station while in TDD for a different base station, (2) monitor the SQCL'ed DL beam pairs for the BFRR response simultaneously (if the user equipment 404 Rx capability permits) for all the base stations, (3) monitoring the "best" SQCL'ed DL beam pair (e.g., the candidate beam having the best channel quality) for the BFRR response for each base station, (4) indicating a preferred DL beam pair in the BFRR to each base station, in which the user equipment 404 monitors the indicated DL beam pair according to the time offset (in this case, the user equipment 404 may only monitor one DL beam, so a recommendation is made as to the best performing beam within each based station), or (5) monitoring the DL beam pair which is a wide beam and SQCL'ed to all configured DL beam pairs within each base station. Although only two simultaneous transmissions are illustrated in FIG. 5B, it is appreciated that any number of simultaneous transmissions may occur.

FIGS. 6A-6D illustrate example flow diagrams in accordance with various embodiments. In the flow diagrams, and for purposes of discussion, the procedures are implemented by user equipment. In one other embodiment, the procedures are implemented by a base station. However, it is appreciated that the procedure may be implemented by any component or device disclosed in any one or more of FIGS. 1, 7A, 7B and 8, and that the disclosed embodiments are non-limiting.

Figure 6A:
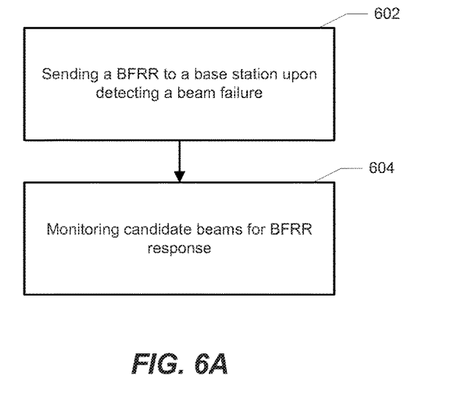
FIGS. 6A-6D illustrate example flow diagrams in accordance with various embodiments.

With reference to FIG. 6A, when a beam failure is detected by the user equipment 110A-110C, the user equipment 110A-110B sends a beam failure recovery request (BFRR) to the servicing base station 170A-170B. In one embodiment, the BFRR uses the PUCCH to report the BFRR to the base station 170A-170B. In another embodiment, the BFRR uses PRACH or PRACH-like channel to report the BFRR to the base station 170A-170B. Once the BFRR has been sent, the user equipment 110A-110C monitors available candidate beams in which to receive the BFRR response from the base station 170A-170B at 604.

Figure 6B:
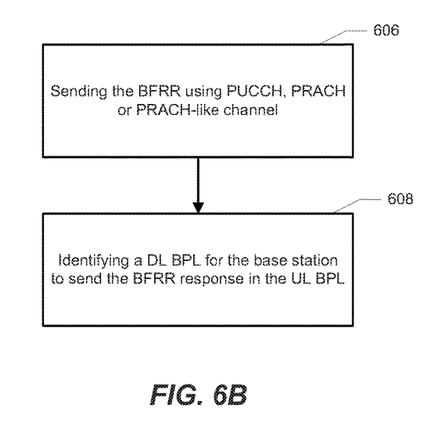

FIG. 6B illustrates a flow diagram of identifying a downlink beam pair. At 606, the user equipment 110A-110C sends a BFRR using a PUCCH, PRACH or PRACH-like channel, such that the user equipment 110A-110C may identify a DL beam pair for the corresponding base station 170A-170B to send the BFRR response in the UL beam pair at 608.

Figure 6C:
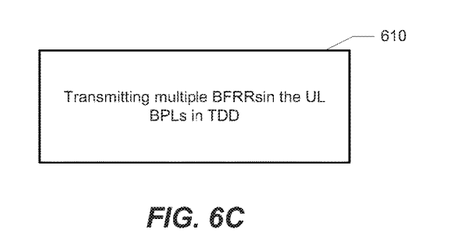

FIG. 6C illustrates a flow diagram in which multiple beam failure recovery requests are transmitted. In the embodiment of FIG. 6C, when two or more UL beam pairs exist, each having a SQCL'ed DL candidate beam pair, the user equipment 110A-110B may transmit multiple BFRRs in two or more UL beam pairs simultaneously at 610, as explained with reference to FIG. 5B.

Figure 6D:
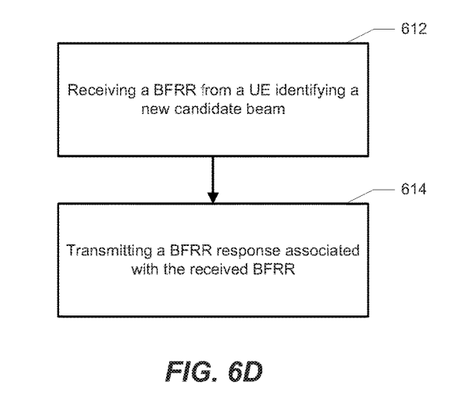

FIG. 6D illustrates a flow diagram in which new candidate beams are received and identified by a base station. At 612, the base station 170A-170B receives a BFRR from user equipment 110A-110C identifying a new candidate beam, and transmits a BFRR response associated with the received BFRR at 614. In one embodiment, the association between the BFRR response and the received BFRR is represented by a time offset from the BFRR reception to the BFRR response transmission. In another embodiment, the association between the BFRR response and the received BFRR is represented by a time offset from the BFRR reception to the starting position of a time window within which to transmit the BFRR response.

Figure 7A:
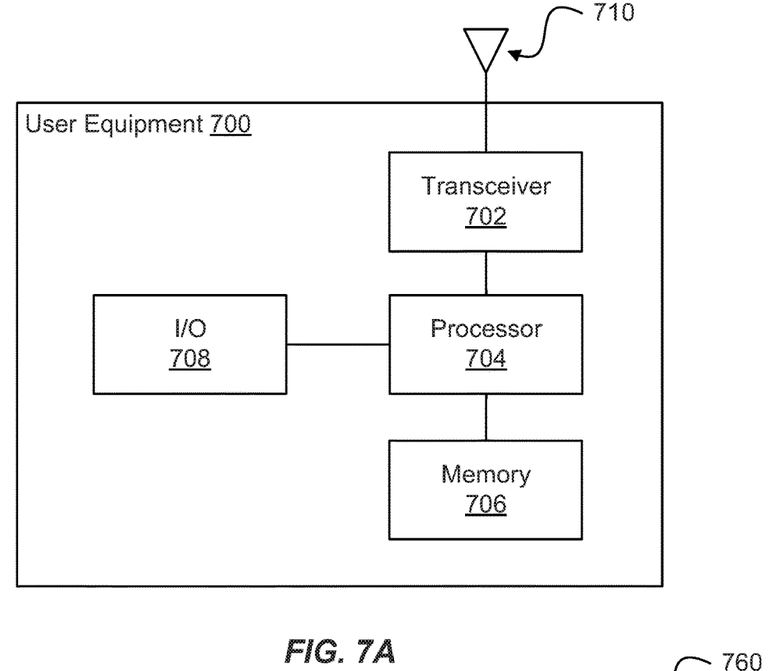
FIG. 7A illustrates example user equipment that may implement the methods and teachings according to this disclosure.

FIG. 7A illustrates example user equipment that may implement the methods and teachings according to this disclosure. As shown in the figure, the UE 700 includes at least one processor 704. The processor 704 implements various processing operations of the UE 700. For example, the processor 704 may perform signal coding, data processing, power control, input/output processing, or any other functionality enabling the UE 700 to operate in the system 100 (FIG. 1). The processor 704 may include any suitable processing or computing device configured to perform one or more operations. For example, the processor 704 may include a microprocessor, microcontroller, digital signal processor, field programmable gate array, or application specific integrated circuit.

The UE 700 also includes at least one transceiver 702. The transceiver 702 is configured to modulate data or other content for transmission by at least one antenna 710. The transceiver 702 is also configured to demodulate data or other content received by the at least one antenna 710. Each transceiver 702 may include any suitable structure for generating signals for wireless transmission and/or processing signals received wirelessly. Each antenna 710 includes any suitable structure for transmitting and/or receiving wireless signals. It is appreciated that one or multiple transceivers 702 could be used in the UE 700, and one or multiple antennas 710 could be used in the UE 700. Although shown as a single functional unit, a transceiver 702 may also be implemented using at least one transmitter and at least one separate receiver.

The UE 700 further includes one or more input/output devices 708. The input/output devices 708 facilitate interaction with a user. Each input/output device 708 includes any suitable structure for providing information to or receiving information from a user, such as a speaker, microphone, keypad, keyboard, display, or touch screen.

In addition, the UE 700 includes at least one memory 706. The memory 706 stores instructions and data used, generated, or collected by the UE 700. For example, the memory 706 could store software or firmware instructions executed by the processor(s) 704 and data used to reduce or eliminate interference in incoming signals. Each memory 706 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 7B:
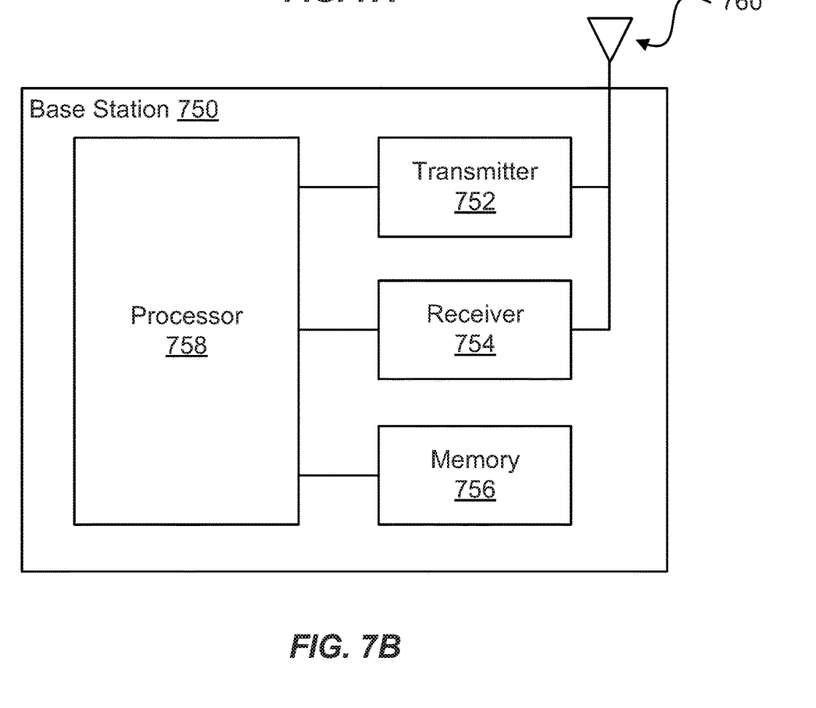
FIG. 7B illustrates example base station that may implement the methods and teachings according to this disclosure.

FIG. 7B illustrates example base station that may implement the methods and teachings according to this disclosure. As shown in the figure, the base station 750 includes at least one processor 758, at least one transmitter 752, at least one receiver 754, one or more antennas 760, and at least one memory 756. The processor 758 implements various processing operations of the base station 750, such as signal coding, data processing, power control, input/output processing, or any other functionality. Each processor 758 includes any suitable processing or computing device configured to perform one or more operations. Each processor 758 could, for example, include a microprocessor, microcontroller, digital signal processor, field programmable gate array, or application specific integrated circuit.

Each transmitter 752 includes any suitable structure for generating signals for wireless transmission to one or more UEs or other devices. Each receiver 754 includes any suitable structure for processing signals received wirelessly from one or more UEs or other devices. Although shown as separate components, at least one transmitter 752 and at least one receiver 754 could be combined into a transceiver. Each antenna 760 includes any suitable structure for transmitting and/or receiving wireless signals. While a common antenna 760 is shown here as being coupled to both the transmitter 752 and the receiver 754, one or more antennas 760 could be coupled to the transmitter(s) 752, and one or more separate antennas 760 could be coupled to the receiver(s) 754. Each memory 756 includes any suitable volatile and/or non-volatile storage and retrieval device(s).

Figure 8:
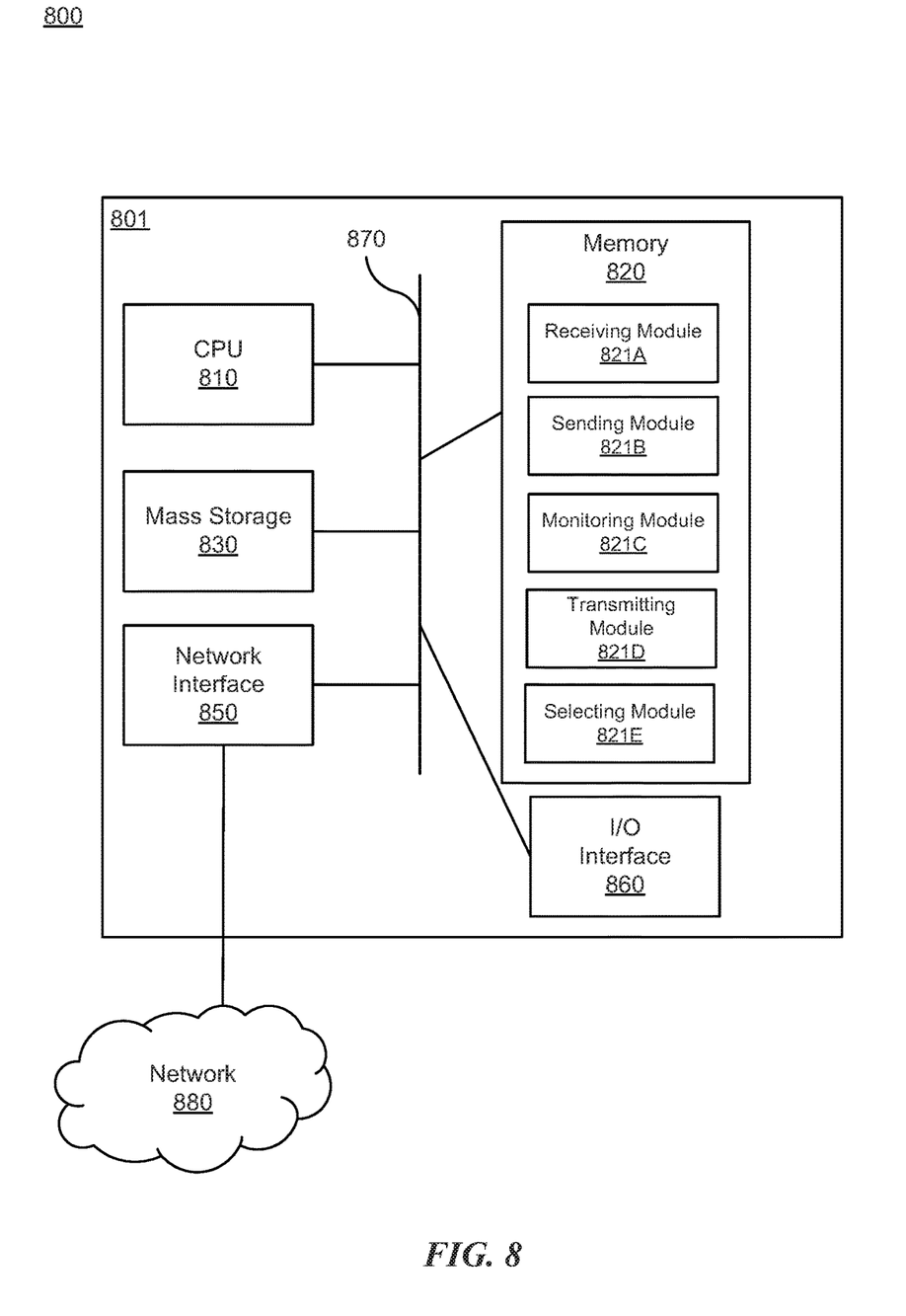
FIG. 8 illustrates a block diagram of a network system that can be used to implement various embodiments.

FIG. 8 is a block diagram of a network device that can be used to implement various embodiments. Specific network devices may utilize all of the components shown, or only a subset of the components, and levels of integration may vary from device to device. Furthermore, the network device 800 may contain multiple instances of a component, such as multiple processing units, processors, memories, transmitters, receivers, etc. The network device 800 may comprise a processing unit 801 equipped with one or more input/output devices, such as network interfaces, storage interfaces, and the like. The processing unit 801 may include a central processing unit (CPU) 810, a memory 820, a mass storage device 830, and an I/O interface 860 connected to a bus 870. The bus 870 may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. In one embodiment, the memory 820 includes receiving module 821A receiving spatial quasi co-located information between a downlink beam pair and an uplink beam pair from a base station and receiving an association indication between the downlink beam pair for a beam failure recovery request (BFRR) response and the uplink beam pair for the BFRR, a sending module 821B sending a BFRR to the base station upon detection of a beam failure between the base station and the user equipment, a monitoring module 821C monitoring one or more available candidate beams in which to receive the BFRR response from the base station, where the BFRR response is associated with the BFRR, a transmitting module 821D transmitting multiple BFRRs in two or more uplink beam pairs simultaneously and transmitting multiple BFRRs in the uplink beam pairs in time division duplex (TDD), and a selecting module 821E selecting the one or more available candidate beams based on radio link quality.

The mass storage device 830 may comprise any type of storage device configured to store data, programs, and other information and to make the data, programs, and other information accessible via the bus 870. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 680. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

According to other embodiments, the UE may try beam failure recovery procedure M times. If still no BFRR response is received, UE may report beam failure to high layer, which may trigger RLF; the M is indicated in a system information or it can be sent to UE in RRC, MAC-CE or DCI signaling; the selected downlink beam pair link is spatial QCLed with the UL BPL used to send BFRR; the downlink beam pair link for base station to send BFRR response is indicated by UE in BFRR; each BFRR is associated with a BFRR response; all BFRRs are associated with one BFRR response in a UE selected DL BPL; each BFRR is associated with a BFRR response and all BFRRs are associated with one BFRR response in a UE selected DL BPL.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for beam failure recovery in user equipment, comprising:
    sending a beam failure recovery request (BFRR) to a base station upon detection of a beam failure between the base station and the user equipment; and
    monitoring one or more candidate beams in which to receive from the base station a BFRR response that is spatially quasi co-located with the BFRR, and the monitoring is performed with a time offset relative to the BFRR.

2. The method of claim 1, wherein the monitoring further monitors one or multiple physical downlink control channels (PDCCH) such that a demodulation reference signal of each PDCCH is spatially quasi co-located with a reference signal of one of the one or more candidate beams.

3. The method of claim 2, wherein the candidate beams are identified by the user equipment for data transmission.

4. The method of claim 1, wherein when the BFRR response is not received within a predetermined time period, the user equipment restarts the beam failure recovery.

5. The method of claim 1, wherein upon detection of the beam failure, the BFRR is sent using a physical uplink control channel (PUCCH) in an uplink beam pair.

6. The method of claim 5, wherein when the BFRR is sent using the PUCCH, the user equipment identifies a downlink beam pair for the base station to send the BFRR response in the uplink beam pair.

7. The method of claim 1, wherein upon detection of the beam failure, the BFRR is sent using a physical random access channel (PRACH) or a PRACH-like channel in an uplink beam pair.

8. The method of claim 1, further comprising selecting the one or more candidate beams based on radio link quality.

9. The method of claim 1, wherein the time offset is conveyed during beam configuration signaling or pre-configured with system information over a physical broadcast channel or specified in a technical standard.

10. The method of claim 1, wherein the time offset is from the BFRR to a starting position of the BFRR response monitoring window.

11. The method of claim 10, wherein the time offset is a fixed value.

12. The method of claim 10, wherein the time offset is signaled by one or more of a radio resource configuration message, a medium access control element message, or a downlink control indicator message.

13. The method of claim 1, wherein the time offset is from the BFRR to an ending position of the BFRR response monitoring window.

14. The method of claim 1, wherein the monitoring the one or more candidate beams further includes monitoring for the BFRR response in downlink beam pairs and in a time slot with the time offset to the BFRR.

15. The method of claim 1, wherein when two or more uplink beam pairs exist, each having a spatial quasi co-located downlink beam pair, further comprising transmitting multiple BFRRs in two or more uplink beam pairs simultaneously.

16. The method of calm 1, wherein when two or more uplink beam pairs exist, each having a spatial quasi co-located downlink beam pair, further comprising transmitting multiple BFRRs in the uplink beam pairs in time division duplex (TDD).

17. A device, comprising:
    a non-transitory memory storage comprising instructions; and
    one or more processors in communication with the memory, wherein the one or more processors execute the instructions to:
    send a beam failure recovery request (BFRR) to a base station upon detection of a beam failure between the base station and the device; and
    monitor one or more candidate beams in which to receive from the base station a BFRR response that is spatially quasi co-located with the BFRR, and the monitoring is performed with a time offset relative to the BFRR.

18. The device of claim 17, wherein the one or more processors further execute the instructions to monitor one or multiple physical downlink control channels (PDCCH) such that a demodulation reference signal of each PDCCH is spatially quasi co-located with a reference signal of one of the one or more candidate beams.

19. The device of claim 17, wherein upon detection of the beam failure, the BFRR is sent using a physical uplink control channel (PUCCH) in an uplink beam pair.

20. The device of claim 17, wherein the monitoring the one or more candidate beams further includes monitoring for the BFRR response in downlink beam pairs and in a time slot with the time offset to the BFRR.

21. A non-transitory computer-readable medium storing computer instructions for beam failure recovery in user equipment, that when executed by one or more processors, cause the one or more processors to perform the steps of:
    sending a beam failure recovery request (BFRR) to a base station upon detection of a beam failure between the base station and the user equipment; and
    monitoring one or more candidate beams in which to receive from the base station a BFRR response that is spatially quasi co-located with the BFRR, and the monitoring is performed with a time offset relative to the BFRR.

22. The non-transitory computer-readable medium of claim 21, wherein the monitoring the one or more candidate beams further causes the one or more processors to perform the step of monitoring for the BFRR response in downlink beam pairs and in a time slot with the time offset to the BFRR.

23. A method for handling beam failure recovery in a base station, comprising:
    receiving a beam failure recovery request (BFRR) from a user equipment identifying a candidate beam; and
    transmitting a BFRR response associated with the received BFRR on the candidate beam for which the BFRR response is spatially quasi co-located with the BFRR, and the transmitting is performed with a time offset relative to the BFRR.

24. The method of claim 23, wherein the time offset is from receipt of the BFRR to a starting position of a time window within which to transmit the BFRR response.

25. The method of claim 24, wherein the time offset is a fixed value.

26. The method of claim 24, wherein the time offset is signaled by one or more of a radio resource configuration message, a medium access control element message, or a downlink control indicator message.

27. The method of claim 23, wherein the time offset is from reception of the BFRR to an ending position of a time window within which to transmit the BFRR response.

* * * * *